INVENTORS
JOHN F. MASON,
ROBERT B. EMERY, 3,322,608
AERATING MEDIA
John F. Mason and Robert B. Emery, both of Duncan, Okla., assignors to Halliburton Company, Duncan, Okla., a corporation of Delaware
Filed Sept. 16, 1965, Ser. No. 487,794
2 Claims. (Cl. 161—87)

This invention relates to aerating media and more particularly to materials for diffusing gas in fluidizing apparatus.

Aerating media in the form of plates or rigid blocks are mounted in the bottom of receptacles or conveyors for fluidizing solid particles supported on the plates. Gas under pressure is applied to one side of the plates and passes through the plates and into the mass of particles above the plates. Usually, the rate of flow of gas through the porous plates is sufficiently great to cause the particles directly above the plates to become suspended in the current of gas and the suspended or fluidized mass of particles may readily be conveyed along the surface of the plates. The rate of flow of gas through conventional permeable plates primarily depends upon the difference in pressure between one side of the plate and the other and upon the size of the passages through the plates. In order to obtain a high rate of flow for accomplishing maximum fluidizing of the particles on the plate, large passages in the plate would seem to be desirable. However, large passages result in non-uniform distribution of gas flow and the large openings tend to become clogged with the particles. Accordingly, the efficiency of the system is reduced.

Porous sintered bronze blocks or plates are often used as aerating media in storage containers or air slides. One difficulty in utilizing the sintered bronze plates in a dispensing type container or air slide is that the particles tend to stick to the surface of the plate and become lodged in the pore openings. This, of course, reduces the rate of flow of material along the surface of the aerating media. Furthermore, friction between the pulverulent material and the bronze surface of the plates resists movement of the material across the surface of the plates.

Accordingly, it is an object of this invention to provide an improved aeration material for pulverulent material storage tanks and conveyors.

It is a further object of this invention to provide aerating media having increased permeability, while retaining a small pore size, and a method for making such a material.

It is a still further object of this invention to provide an aeration material having a reduced frictional resistance to translation of a mass of fluidized particles across the surface of the material.

These objects are accomplished in accordance with the preferred embodiment of the invention by a porous plate or block having a plurality of sand or other high temperature melting grains, coated and bonded together by a synthetic halogenated hydrocarbon resin, and particularly by polytetrafluoroethylene. The size of the sand grains is selected to provide the desired permeability when coated with the resin. This preferred aeration material is made by mixing together equal parts of powdered halogenated hydrocarbon resin and sand. The relative grain sizes of the resin and the sand are adjusted to provide the desired pore size. The mixture of sand and resin is heated to a temperature sufficient to cause the resin to coalesce and partially coat the surface of the individual sand grains and to bond together the sand grains, while at the same time leaving interconnected passages extending from one surface of the plate to the other.

Finally, a metal screen is coated with a halogenated hydrocarbon resin, preheated and the coated wire screen is applied to one or both surfaces of the plate. The screen strengthens the plate.

This preferred embodiment of the invention is illustrated in the following drawings in which.

Figure 1:
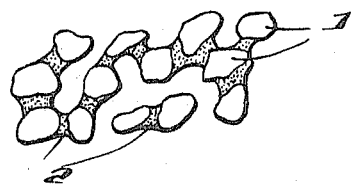
FIGURE 1 is an elevational view showing schematically the structure of the aerating material of this invention.

In producing a gas permeable plate or block, it has been customary to use powdered bronze or other metals that are bonded together by sintering. The porous material of this invention, however, as shown in FIG. 1, includes a plurality of sand grains 1 that are coated, or at least partially coated, and bonded together by a halogenated hydrocarbon resin 2. The resin (polytetrafluoroethylene) does not fill all of the voids between the sand gains, and there are continuous passages through the plate from one surface to the other. In order to simplify the drawing, only a single vertical layer of sand grains is illustrated. Actually, there are a plurality of continuous passages extending through the block, but the passages follow irregular paths.

The permeable plate shown in FIG. 1 is made by mixing together particles of powdered polytetrafluoroethylene resin with grains of sand, or other high temperature melting granular material. The mixture is then heated to a sufficient temperature to cause the resin to become fluid, without decomposing. After a period of time, the heated resin coats the grains of sand and coalesces with adjacent grains of resin to bond together the individual sand grains. While the mixture is being heated, the temperature should be substantially uniform throughout the mixture, so that the resin will be evenly distributed between the sand grains.

Figure 2:
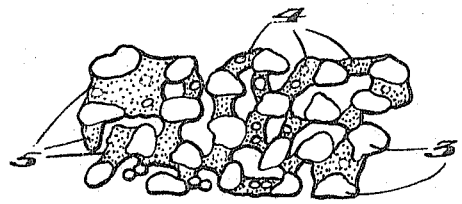
FIGURE 2 is an elevated, schematic view of a modified form of aerating material in accordance with this invention.

In order to provide an aeration material having a lower permeability, sand or other high temperature melting granules of large size may be mixed with particles or grains of relatively small size, so that the small grains partially fill the interstitial spaces between the large grains. A permeable plate in accordance with this modified form is shown in FIG. 2. Large sand grains 3 are distributed throughout the plate and there are a plurality of relatively small sand grains 4 interspersed through the voids between the large grains. Particles of the halogenated hydrocarbon resin are mixed with the sand and after it is heated, the resin 5 coalesces around the small grains and fills the interstitial spaces to a greater extent than when only large grains are used, as in FIG. 1. The resin also partially coats the large grains.

As an example of a gas permeable block formed in accordance with this invention, sand of between 40 and 60 mesh and powdered tetrafluoroethylene polymer were mixed together in a 1-to-1 volume ratio and placed in a steel mold. The bottom of the mold was lined with aluminum foil. The mixture was leveled in the mold and packed down evenly with a mold cap. The cap was then removed and the mold was placed in an oven maintained at a temperature of 610° F. After one hour, the mold was removed and cooled to room temperature. The sand grains were bonded together in the sample and minute interconnected passages were formed through the sample. The air permeability of the sample was 13.0 cubic feet of air per square foot per minute at 2 inches of water differential pressure. A force of 60 to 80 pounds applied at the ecnter of a 1 inch span fractured the ¼-inch thick sample.

Figure 3:
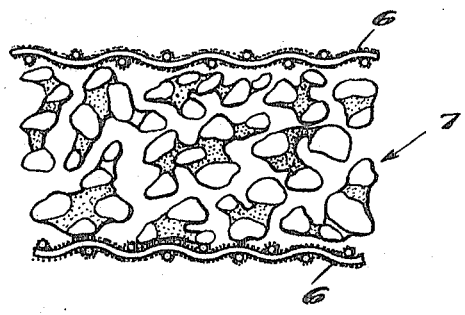
FIGURE 3 is an elevational, schematic view of a second modified form of the aerating material of this invention.

In order to increase the beam strength of the areating material, a wire screen 6 may be applied to a surface of the plate 7, as shown in FIG. 3. The screens are preferably coated with the fluorinated hydrocarbon resin before being applied to the surface of sand-resin mixture which forms the plate. The screen wires should be relatively small so that they will not interfere with the flow of air through the aerating material.

A gas permeable plate was made in accordance with this invention by preheating wire screens for 10 minutes, then dipping the screens in a fluidized bed of tetrafluoroethylene polymer for 1 minute, and then post-heating the screens for 20 minutes at 700° F. Powdered tetrafluoroethylene polymer and sand were mixed together in equal volumes and the mixture was packed down evenly to form a thin plate. The screens were placed on opposite surfaces of the sample and the sample was enclosed in aluminum foil. The sample was then placed in an oven at 610° F. After one hour, the sample was removed and cooled to room temperature. The aluminum foil was removed by dissolving with hydrochloric acid and then washed, and the sample was then placed back in the furnace at 610° F. for 20 minutes.

The air permeability of the sample was found to be 12.3 cubic feet of air per square foot per minute at 2.0 inches of water differential pressure. The bonding ability of tetrafluoroethylene polymers to said was found to be good and the surface of the sample had a shiny appearance. The sample was subjected to a force of 530 pounds applied at the center of a span measuring 1 inch and this caused an 0.22 inch deflection in the ¼-inch thick sample. Thus, the resin bonded wire screens on the surface of the plate considerably increased the beam strength of the sample.

The grain size of the sand should be relatively large in relation to the size of the resin particles. Preferably, the sand grains should pass a No. 40 (U.S.) sieve (.0165 inch opening) and be retained on a No. 60 (U.S.) sieve (.0098 inch opening). If larger grain sizes are used, the spaces betwen the grains tend to be larger. The resin particles are smaller than the sand grains, so that the resin particles will infiltrate the spaces between the sand grains. When the mixture is heated, the resin coats the adjacent sand grains and coalesces to bridge the voids and bond the sand grains together. Satisfactory results have been achieved by mixing resin particles less than one-quarter the size of the sand grains. In order to reduce the permeability of an aeration plate, fine grain sand may be added to the mixture. The filter sand should have about the same average grain size as the resin particles in the mixture.

The volume ratio of said to resin may vary, depending on the desired permeability, but sufficient resin must be present in the mixture to ensure good bonding of the sand grains. Equal volumes of said and resin particles have been found to provide good bonding and coating of the sand grains. Smaller percentages of resin in the mixture weaken the bond and the sand grains are easily dislodged from the aeration plate.

In a modified form of the invention, a plate of sintered bronze, aluminum oxide, or other gas permeable material is coated with chlorinated hydrocarbon resin particles. The resin coating should not fill the gas passage in the plate, since this would reduce the permeability of the plate or render the plate impermeable. The coating is preferably applied by heating the aerating plate to a temperature above the softening temperature of the resin, dipping the plate in a fluidized bed of chlorinated hydrocarbon resin particles until the plate is coated and curing the coated plate at an elevated temperature. By coating the plate in a fluidized bed of resin, the particles of resin are uniformly distributed over the individual bronze, aluminum oxide or other particular material in the plate, and the resin does not clog or fill the gas passages in the plate.

The halogenated resins that are preferably used in the gas premeable materials of this invention are chlorinated polyethers or especially polytetrafluoroethylene. Both of these materials have very low water absorption factors and have a low coefficient of friction. Fluidized pulverulent material passes over the surface of the aerating material as it is being conveyed toward the discharge outlet of the container, or along the surface of the aeration plates of a conveyor. Since the coated grains or particles in the plates of this invention have a low coefficient of friction, the frictional resistance to the movement of the pulverulent material is minimized.

The gas permeable plates of this invention are adapted to be used in apparatus for fluidizing and dispensing pulverulent material. It is important that the gas flow uniformly through the plates, so that the pulverulent material above the plates is uniformly fluidized. An uneven flow of air may cause channeling of air currents through the material. It has been found that the processes of this invention, in which powdered halogenated resin is mixed with inert grains before heating, or are applied to the surface of a permeable plate, form a gas permeable plate with substantially uniform distribution of passages, even though the passages are purposely made very small.

There is another advantage in utilizing halogenated resins. The aerating plates of this invention may be used in containers for transporting pulverulent material. The same containers also may at other times be used for transporting liquids, such as acids. Conventional bronze aeration plates would be corroded by the acids, but the halogenated hydrocarbon resins in the plates of this invention have a negligible water absorption factor and are not corroded by acids. Therefore, the aerating material of this invention may be readily used in containers for transporting solid dry materials as well as corrosive liquids.

While this invention has been illustrated and described in several embodiments, it is recognized that variations and changes may be made therein without departing from the invention as set forth in the claims.

We claim:

1. A gas permeable aeration plate comprising a plurality of sand grains, polytetrafluoroethylene resin interspersed between and bonding the sand grains to give a coherent gas permeable plate having minute interconnected passages formed therethrough, said sand grains being randomly distributed throughout said plate and occupying at least half of the combined volume of sand and resin and a metal screen bonded to at least one side of said permeable plate.

2. A gas permeable aeration plate according to claim 1 wherein said sand grains pass through a Number 40 (U.S.) sieve and are retained on a Number 60 (U.S.) sieve, and said resin is substantially uniformly distributed throughout the plate.

References Cited

UNITED STATES PATENTS

| 2,392,263 | 1/1946 | Records | 166—228 |
| 3,173,488 | 3/1965 | Rensvold | 166—228 |

FOREIGN PATENTS

| 158,379 | 8/1954 | Australia. |
| 688,672 | 6/1964 | Canada. |
| 235,557 | 8/1926 | Great Britain. |
| 991,909 | 5/1965 | Great Britain. |

ALEXANDER WYMAN, *Primary Examiner.*

D. H. ROBESON, M. A. LITMAN, *Assistant Examiners.*